J. M. KING.
Grain Binder.

No. 49,889.

Patented Sept. 12, 1865.

Witnesses:

Inventor:

UNITED STATES PATENT OFFICE.

JAMES M. KING, OF WINONA, MINNESOTA.

IMPROVEMENT IN BINDING ATTACHMENTS TO REAPERS.

Specification forming part of Letters Patent No. 49,889, dated September 12, 1865.

*To all whom it may concern:*

Be it known that I, J. M. KING, of Winona, in the State of Minnesota, have invented a new and useful Attachment for Harvesting-Machines; and I do hereby declare that the following is a full, clear, and exact description of the same, reference being had to the accompanying drawings, in which—

Figure 1:
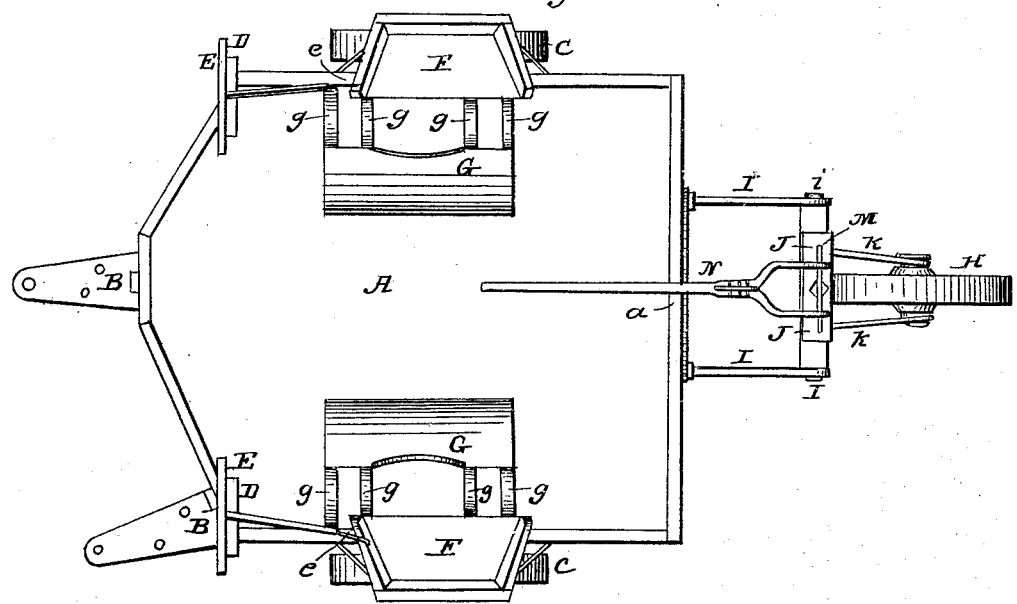
Figure 2:
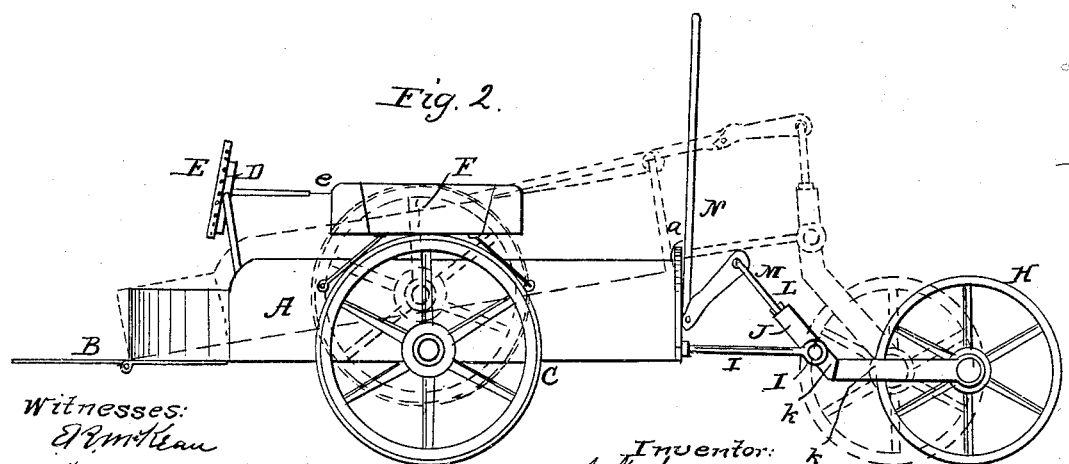

Figure 1 is a plan view of my machine. Fig. 2 is a side elevation of the same.

The nature of my invention consists in providing a suitable carriage to be attached to the rear of the harvester, in which carriage the grain is delivered and bound by persons situated in said carriage.

That others may understand the construction and operation of my invention, I will particularly describe it.

A is the body and frame of the carriage, which is attached to the reaping-machine by the hinge-joints B, and is supported upon the wheels C C. Upon each side are the stands D D, which consist of a cross-piece upon the top of a post, and the duty they have to perform is simply to hold the rakes E E when not in use. The seats F F are provided for the binders, in front of each of whom is the inclined board G G, behind which the binder's feet and legs are accommodated. The rear end of the carriage A is provided with the caster-wheel H, upon which the carriage is supported, as shown in red lines in Fig. 2, when the machine is to be turned around, as at the end of the field.

The operation of my invention is as follows: The grain as it is cut by the harvester falls or is delivered upon the platform A, whence by a stroke of the rake E it is drawn up the inclined board G into the cradle formed by the upper edges of the pieces *g g*, and is there bound in the ordinary way. To the handle of the rake E is attached an elastic cord, *e*, which is also attached to the side of the seat, as represented, so that after having raked up the gavel he extends the rake-head over the stand D, the rake-teeth hooking or catching over the same, and the elastic cord drawing back upon the handle keeps the rake thus hooked over D. The rake is then in a convenient position to be regained when required to draw up another gavel.

When the machine is to be turned, as at the corner of the field, it is, of course, necessary to raise the wheels C C from the ground, because, being rigidly attached to the reaper, the wheels C C would prevent the machine from turning unless they had some independent adjustment of their own, which they have not, it being considered by me more economical to provide the caster-wheel F than to provide means of changing and controlling the direction of the movements of the wheels C.

The construction and operation of H is very simple. The frame I projects from the rear edge of A. Pivoted at *i* to the outer ends of I is the cross-frame J. The frame K, embracing the wheel H, has a shank or pivot running up through J, with a nut or head on its upper end at L. Upon the top of J is a lengthening piece, M, and the top of M is connected to the frame of A by the jointed or elbow lever N, which is pivoted to said frame A at *a*. When, then, it becomes necessary to turn a corner the lever N is brought to a horizontal position, as shown in Fig. 1 and by red lines in Fig. 2, the elbow of N is straightened, and the frame J brought to a perpendicular position, which results in raising the rear end of the frame A and the wheels C farther from the ground, leaving the weight of A upon the wheel F, which is free to move in any direction, like any other caster-wheel.

Having described my invention, what I claim as new, and desire to secure by Letters Patent, is—

1. In combination with the seat F and inclined board G, the rake E, when attached by the elastic cord *e*, and the rake-stand D, substantially as described.

2. In combination with the carriage A, the adjustable caster-wheel H, arranged, operated, and operating substantially as described.

J. M. KING.

Witnesses:
W. C. DODGE,
R. D. O. SMITH